US009063570B2

(12) United States Patent
Weddle et al.

(10) Patent No.: US 9,063,570 B2
(45) Date of Patent: Jun. 23, 2015

(54) HAPTIC FEEDBACK CONTROL SYSTEM

(75) Inventors: Amaya Becvar Weddle, San Jose, CA (US); David Birnbaum, Oakland, CA (US); Satvir Singh Bhatia, Plano, TX (US)

(73) Assignee: Immersion Corporation, San Jose, CA (US)

( * ) Notice: Subject to any disclaimer, the term of this patent is extended or adjusted under 35 U.S.C. 154(b) by 204 days.

(21) Appl. No.: 13/613,004

(22) Filed: Sep. 13, 2012

(65) Prior Publication Data

US 2014/0002346 A1 Jan. 2, 2014

Related U.S. Application Data

(60) Provisional application No. 61/664,918, filed on Jun. 27, 2012.

(51) Int. Cl.
*G09G 5/00* (2006.01)
*G06F 3/01* (2006.01)

(52) U.S. Cl.
CPC .......... *G06F 3/016* (2013.01); *G06F 2203/014* (2013.01)

(58) Field of Classification Search
CPC .............. G06F 3/016; G06F 2203/014; G06F 2203/015; G10H 2220/311
USPC ................................. 345/156–184; 715/702; 340/407.1–407.2
See application file for complete search history.

(56) References Cited

U.S. PATENT DOCUMENTS

| 6,300,936 | B1 * | 10/2001 | Braun et al. ................ 345/156 |
| 6,433,771 | B1 * | 8/2002 | Yocum et al. ............... 345/156 |
| 7,952,498 | B2 | 5/2011 | Higa |
| 8,294,600 | B2 * | 10/2012 | Peterson et al. ................ 341/27 |
| 8,373,549 | B2 * | 2/2013 | Fadell et al. ................ 340/407.2 |
| 8,400,283 | B2 * | 3/2013 | Fadell et al. ............... 340/407.2 |
| 8,754,759 | B2 * | 6/2014 | Fadell et al. ............... 340/407.2 |
| 8,896,524 | B2 * | 11/2014 | Birnbaum et al. ........... 345/156 |
| 2008/0294984 | A1 * | 11/2008 | Ramsay et al. ............... 715/702 |
| 2009/0002140 | A1 | 1/2009 | Higa |
| 2009/0231271 | A1 | 9/2009 | Heubel et al. |
| 2009/0295739 | A1 * | 12/2009 | Nagara ........................ 345/173 |
| 2010/0033426 | A1 | 2/2010 | Grant et al. |
| 2010/0073304 | A1 | 3/2010 | Grant et al. |
| 2011/0095875 | A1 * | 4/2011 | Thyssen et al. ............ 340/407.1 |
| 2011/0102161 | A1 | 5/2011 | Heubel et al. |
| 2011/0175838 | A1 | 7/2011 | Higa |
| 2012/0019463 | A1 | 1/2012 | Ng et al. |
| 2012/0038582 | A1 | 2/2012 | Grant |
| 2012/0113008 | A1 | 5/2012 | Makinen et al. |
| 2012/0268285 | A1 * | 10/2012 | Hansen ...................... 340/691.1 |
| 2013/0088438 | A1 * | 4/2013 | Shih et al. .................... 345/173 |

* cited by examiner

*Primary Examiner* — Rodney Amadiz
(74) *Attorney, Agent, or Firm* — Miles & Stockbridge P.C.

(57) ABSTRACT

A feedback control system is provided. The feedback control system receives a user input. The feedback control system determines a context. The feedback control system displays a control in response to the user input and based on the context. The feedback control system adjusts a feedback parameter according to the control, where the control is configured to adjust feedback output to a user based on the adjusted feedback parameter.

28 Claims, 8 Drawing Sheets

HAPTIC FEEDBACK CONTROL SYSTEM

CROSS-REFERENCE TO RELATED APPLICATIONS

This application claims priority of U.S. Provisional Patent Application Ser. No. 61/664,918, filed on Jun. 27, 2012, the disclosure of which is hereby incorporated by reference.

FIELD

One embodiment is directed generally to feedback, and more particularly, to haptic feedback.

BACKGROUND

Electronic device manufacturers strive to produce a rich interface for users. Conventional devices use visual and auditory cues to provide feedback to a user. In some interface devices, kinesthetic feedback (such as active and resistive force feedback) and/or tactile feedback (such as vibration, texture, and heat) is also provided to the user, more generally known collectively as "haptic feedback" or "haptic effects." Haptic feedback can provide cues that enhance and simplify the user interface. Specifically, vibration effects, or vibrotactile haptic effects, may be useful in providing cues to users of electronic devices to alert the user to specific events, or provide realistic feedback to create greater sensory immersion within a simulated or virtual environment.

Haptic feedback has also been increasingly incorporated in portable electronic devices, referred to as "handheld devices" or "portable devices," such as cellular telephones, personal digital assistants ("PDAs"), tablets, smartphones, and portable gaming devices. For example, some portable gaming applications are capable of vibrating in a manner similar to control devices (e.g., joysticks, etc.) used with larger-scale gaming systems that are configured to provide haptic feedback. Additionally, devices such as cellular telephones and smartphones are capable of providing various alerts to users by way of vibrations. For example, a cellular telephone can alert a user to an incoming telephone call by vibrating. Similarly, a smartphone can alert a user to a scheduled calendar item or provide a user with a reminder for a "to do" list item or calendar appointment.

Further, such devices can provide haptic feedback to complement audio and/or video effects that the devices can output to a user, to provide a more immersive experience. For example, if a user watches video that is output by a smartphone, or listens to music that is output by the smartphone, the smartphone can also output haptic feedback that complements the audio and/or video.

SUMMARY

One embodiment is a system that controls feedback output to a user. The system receives a user input. The system determines a context. The system displays a control in response to the user input and based on the context. The system adjusts a feedback parameter according to the control, where the control is configured to adjust the feedback output to the user based on the adjusted feedback parameter.

BRIEF DESCRIPTION OF THE DRAWINGS

Further embodiments, details, advantages, and modifications will become apparent from the following detailed description of the preferred embodiments, which is to be taken in conjunction with the accompanying drawings.

DETAILED DESCRIPTION

One embodiment is a haptic feedback control system that controls haptic feedback that is output to a user based on input provided by a physical button or switch of a device, and based on a context of the device. The haptic feedback control system can display a haptic control user interface in response to the input provided by the physical button or switch and in response to a determination that the context of the device is appropriate for controlling haptic feedback that is output to the user. The user can interact with the haptic control user interface, for example, by touching the haptic control user interface to control haptic feedback that is provided by the device and that is output to the user.

As described herein, a "gesture" is any movement of the body that conveys meaning or user intent. Simple gestures can be combined to form more complex gestures. For example, bringing a finger into contact with a touch sensitive surface can be referred to as a "finger on" gesture, while removing a finger from a touch sensitive surface can be referred to as a separate "finger off" gesture. If the time between the "finger on" and "finger off" gestures is relatively short, the combined gesture may be referred to as "tapping," or "pressing." If the time between the "finger on" and "finger off" gestures is relatively long, the combined gesture may be referred to as "long tapping," or "long pressing." If the distance between the two dimensional (x,y) positions of the "finger on" and "finger off" gestures is relatively large, the combined gesture may be referred to as "swiping." If the distance between the two dimensional (x,y) positions of the "finger on" and "finger off" gestures is relatively small, the combined gesture may be referred to as "smearing," "smudging" or "flicking." Any number of two-dimensional or three-dimensional simple or complex gestures may be combined in any manner to form any number of other gestures, including, but not limited to, multiple finger contacts, palm or first contact, or proximity to the device. A gesture can also be any form of hand movement recognized by a device having an accelerometer, gyroscope, or other motion sensor, and converted to electronic signals. Such electronic signals can activate a haptic effect, such as vibration, where the sensor captures the user intent that generates the haptic effect. Further a "control user interface" or "control" is a user interface that can be displayed by a device that allows a user to control feedback output by the device, when the user gestures within the user interface.

Figure 1:
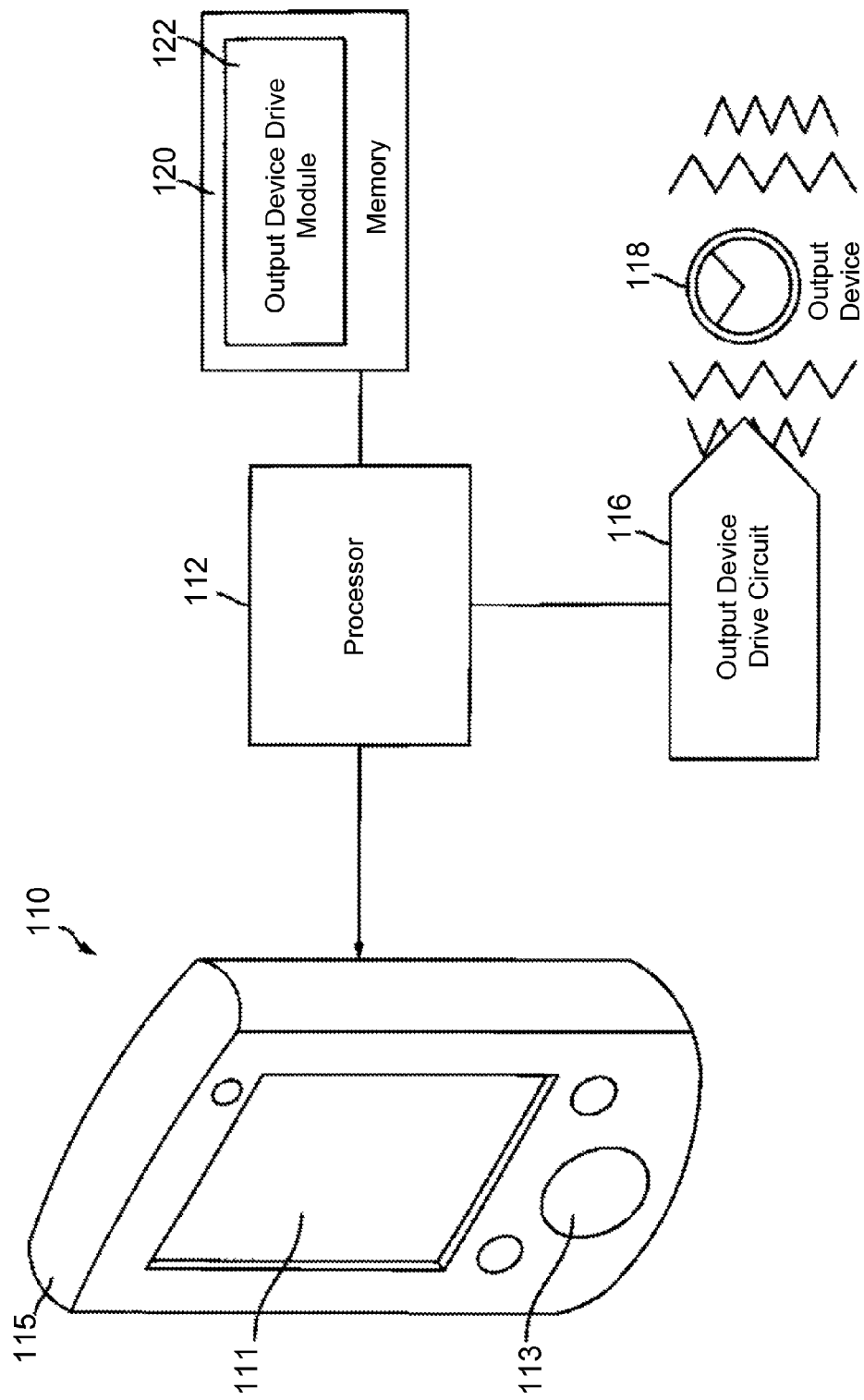
FIG. 1 illustrates a block diagram of a haptically-enabled system in accordance with one embodiment of the invention.

FIG. 1 illustrates a block diagram of a haptically-enabled system 110 in accordance with one embodiment of the invention. System 110 includes a touch sensitive surface 111 or other type of user interface mounted within a housing 115, and may include physical buttons/switches 113. Internal to system 110 is a haptic feedback system that generates haptic effects, such as vibrations, on system 110. In one embodiment, the haptic effects are generated on touch surface 111.

The haptic feedback system includes a processor 112. Coupled to processor 112 is a memory 120 and an output device drive circuit 116, which is coupled to an output device 118 (such as an actuator). Processor 112 may be any type of general purpose processor, or can be a processor specifically designed to provide haptic effects, such as an application-specific integrated circuit ("ASIC"). Processor 112 may be the same processor that operates the entire system 110, or may be a separate processor. Processor 112 can decide what haptic effects are to be played and the order in which the effects are played based on high level parameters. In general, the high level parameters that define a particular haptic effect include magnitude, frequency and duration. Low level parameters such as streaming motor commands could also be used to determine a particular haptic effect. A haptic effect may be considered dynamic if it includes some variation of these parameters when the haptic effect is generated or a variation of these parameters based on a user's interaction.

Processor 112 outputs the control signals to drive circuit 116, which includes electronic components and circuitry used to supply output device 118 with the required electrical current and voltage to cause the desired haptic effects. System 110 may include more than one output device 118, and each output device may include a separate drive circuit 116, all coupled to a common processor 112. Memory device 120 can be any type of storage device or computer-readable medium, such as random access memory ("RAM") or read-only memory ("ROM"). Memory 120 stores instructions executed by processor 112. Among the instructions, memory 120 includes an output device drive module 122 which are instructions that, when executed by processor 112, generate drive signals for output device 118 while also determining feedback from output device 118 and adjusting the drive signals accordingly. The functionality of module 122 is discussed in more detail below. Memory 120 may also be located internal to processor 112, or any combination of internal and external memory.

Touch surface 111 recognizes touches, and may also recognize the position and magnitude or pressure of touches on the surface. The data corresponding to the touches is sent to processor 112, or another processor within system 110, and processor 112 interprets the touches and in response generates haptic effect signals. Touch surface 111 may sense touches using any sensing technology, including capacitive sensing, resistive sensing, surface acoustic wave sensing, pressure sensing, optical sensing, etc. Touch surface 111 may sense multi-touch contacts and may be capable of distinguishing multiple touches that occur at the same time. Touch surface 111 may be a touchscreen that generates and displays images for the user to interact with, such as keys, dials, etc., or may be a touchpad with minimal or no images.

System 110 may be a handheld device, such a cellular telephone, personal digital assistant ("PDA"), computer tablet, gaming console, etc. or may be any other type of device that provides a user interface and includes a haptic effect system that includes one or more eccentric rotating mass motors ("ERMs"), linear resonant actuators ("LRAs"), electrostatic or other types of actuators. The user interface may be a touch sensitive surface, or can be any other type of user interface such as a mouse, touchpad, mini-joystick, scroll wheel, trackball, game pads or game controllers, etc. In embodiments with more than one actuator, each actuator may have a different output capability in order to create a wide range of haptic effects on the device. Each actuator may be any type of haptic actuator or a single or multidimensional array of actuators.

Figure 2:
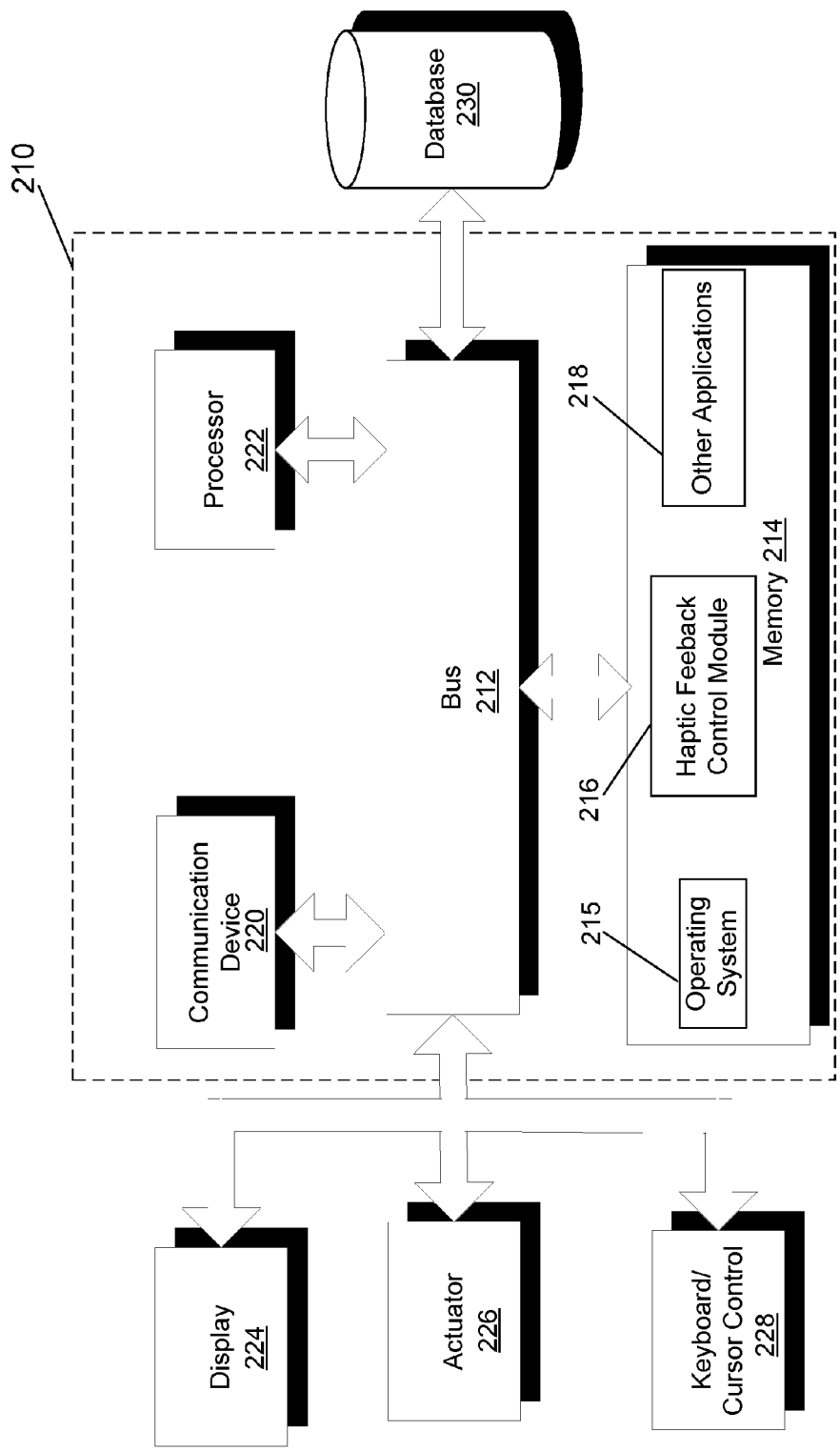
FIG. 2 illustrates a block diagram of a haptic feedback system in accordance with another embodiment of the invention.

FIG. 2 illustrates a block diagram of a haptic feedback system 210 in accordance with another embodiment of the invention. In one embodiment, haptic feedback system 210 is part of a device (such as device 110 of FIG. 1), and haptic feedback system 210 provides a haptic feedback control functionality for the device. Although shown as a single system, the functionality of haptic feedback system 210 can be implemented as a distributed system. Haptic feedback system 210 includes a bus 212 or other communication mechanism for communicating information, and a processor 222 coupled to bus 212 for processing information. Processor 222 may be any type of general or specific purpose processor. Haptic feedback system 210 further includes a memory 214 for storing information and instructions to be executed by processor 222. Memory 214 can be comprised of any combination of RAM, ROM, static storage such as a magnetic or optical disk, or any other type of computer-readable medium.

A computer-readable medium may be any available medium that can be accessed by processor 222 and may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of an information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of a storage medium known in the art.

In one embodiment, memory 214 stores software modules that provide functionality when executed by processor 222. The modules include an operating system 215 that provides operating system functionality for haptic feedback system 210, as well as the rest of a mobile device in one embodiment. The modules further include a haptic feedback control module 216 that controls haptic feedback, as disclosed in more detail below. In certain embodiments, haptic feedback control module 216 can comprise a plurality of modules, where each individual module provides specific individual functionality for controlling haptic feedback. Haptic feedback system 210 will typically include one or more additional application modules 218 to include additional functionality, such as Integrator™ by Immersion Corporation.

Haptic feedback system 210, in embodiments that transmit and/or receive data from remote sources, further includes a communication device 220, such as a network interface card, to provide mobile wireless network communication, such as infrared, radio, Wi-Fi, or cellular network communication. In other embodiments, communication device 220 provides a wired network connection, such as an Ethernet connection or a modem.

Processor 222 is further coupled via bus 212 to a display 224, such as a Liquid Crystal Display ("LCD"), for displaying a graphical representation or user interface to a user. The display 224 may be a touch-sensitive input device, such as a touchscreen, configured to send and receive signals from processor 222, and may be a multi-touch touchscreen. Processor 222 may be further coupled to a keyboard or cursor control 228 that allows a user to interact with haptic feedback system 210, such as a mouse or a stylus.

System 210, in one embodiment, further includes an actuator 226. Processor 222 may transmit a haptic signal associated with a generated haptic effect to actuator 226, which in turn outputs haptic effects such as vibrotactile haptic effects. Actuator 226 includes an actuator drive circuit. Actuator 226 may be, for example, an electric motor, an electro-magnetic actuator, a voice coil, a shape memory alloy, an electroactive polymer, a solenoid, an ERM, an LRA, a piezoelectric actuator, a high bandwidth actuator, an electroactive polymer ("EAP") actuator, an electrostatic friction display, or an ultrasonic vibration generator. In alternate embodiments, haptic feedback system 210 can include one or more additional actuators, in addition to actuator 226 (not illustrated in FIG. 2). In other embodiments, a separate device from haptic feedback system 210 includes an actuator that generates the haptic effects, and haptic feedback system 210 sends generated haptic effect signals to that device through communication device 220.

Haptic feedback system 210 can further be operatively coupled to a database 230, where database 230 can be configured to store data used by modules 216 and 218. Database 230 can be an operational database, an analytical database, a data warehouse, a distributed database, an end-user database, an external database, a navigational database, an in-memory database, a document-oriented database, a real-time database, a relational database, an object-oriented database, or any other database known in the art.

Figure 3:
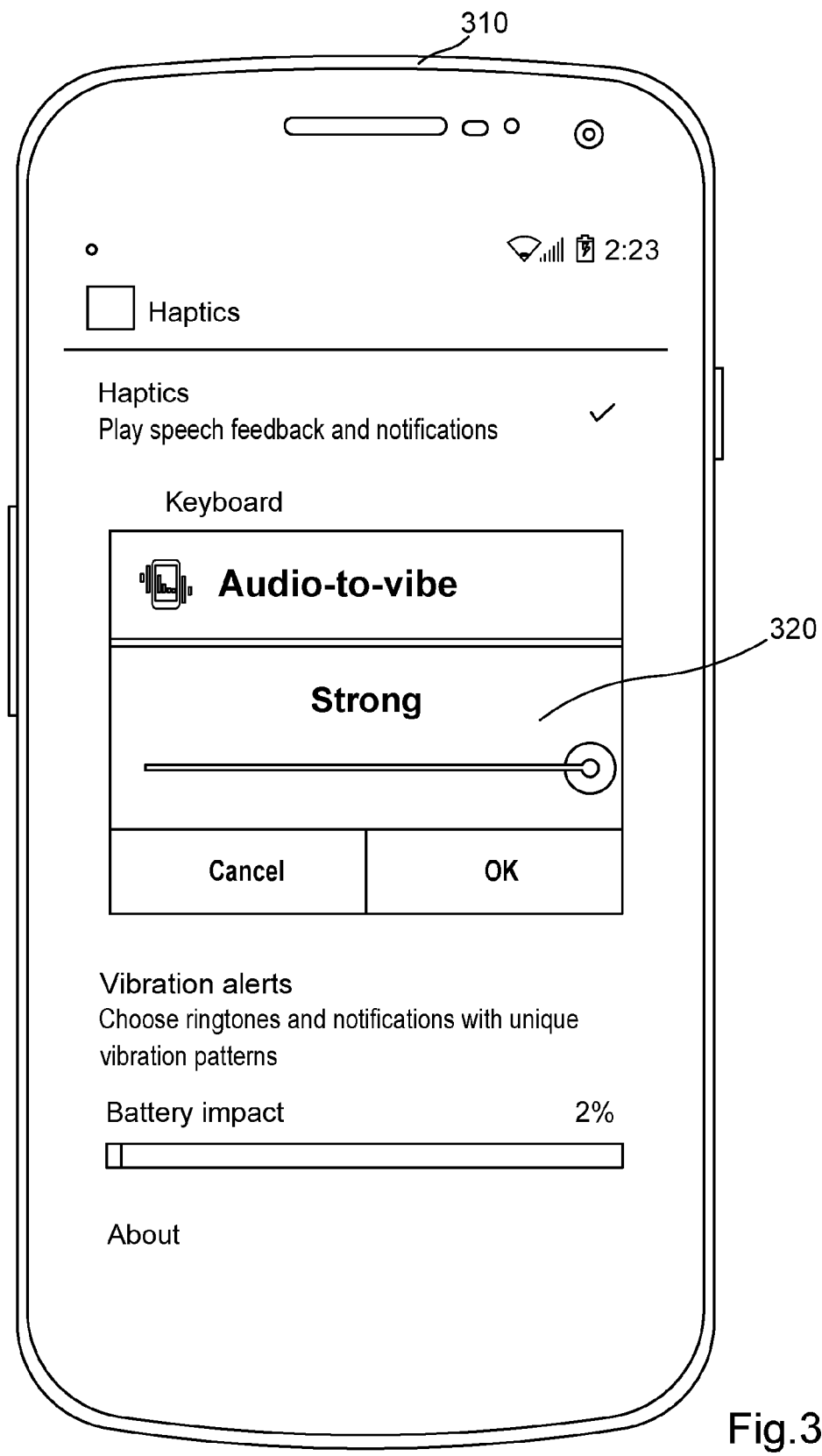
FIG. 3 illustrates an example haptic control displayed within a user interface of a device, according to one embodiment of the invention.

FIG. 3 illustrates an example haptic control 320 displayed within a user interface of a device 310, according to one embodiment of the invention. Device 310 can be a handheld device, such a cellular telephone, PDA, computer tablet, gaming console, etc. or may be any other type of device that provides a user interface and includes a haptic effect system that includes one or more ERMs, LRAs, electrostatic or other types of actuators. As previously described, device 310 can provide a user haptic feedback, either in isolation, or in conjunction with audio and/or video. For example, device 310 can provide audio to a user (such as playing music), and use one or more algorithms to covert the audio into haptic feedback, and provide the haptic feedback in conjunction with the audio. In general, users want to be in tight control of such haptic feedback, and it can be a burden to exit an application that outputs audio and/or video (thus, interrupting their entertainment), in order to adjust the haptic feedback. Further, because a user wishes to tightly control the haptic feedback provided by device 310, it can be very cumbersome for a user to interrupt feedback provided by device 310 in order to adjust how device 310 provides haptic feedback to the user. For example, while a user can pause the provision of audio by device 310 in order to access a "settings" user interface of device 310 in order to adjust haptic feedback provided to the user, the access of the settings user interface can be a time-intensive process, and can interrupt enjoyment of the audio provided by device 310.

According to the embodiment, device 310 can display haptic control 320, where haptic control 320 is configured to control haptic feedback that can be provided by device 310. More specifically, haptic control 320 can be configured to adjust one or more haptic parameters of the haptic feedback that can be provided by device 310, where the adjustment of the one or more haptic parameters adjusts the haptic feedback. An example haptic feedback parameter is a strength parameter that controls a strength of the haptic feedback. Another example haptic feedback parameter is a density parameter that controls a density of the haptic feedback. Yet another example haptic feedback parameter is a sharpness parameter that controls a sharpness of the haptic feedback.

A further example haptic feedback parameter is a mode parameter that controls a "mode" of the haptic feedback. More specifically, certain haptic feedback parameter configurations can be classified as "modes," where a haptic feedback parameter configuration includes a plurality of haptic parameters and a corresponding plurality of pre-defined values. In one example, a haptic feedback configuration where the strength, density, and sharpness parameters are associated with specific large values can be classified as a "strong" mode. In contrast, a haptic feedback configuration where the strength, density, and sharpness parameters are associated with specific small values can be classified as a "light" mode. By adjusting the mode parameter from a "light" mode to a "strong" mode, the haptic feedback can be adjusted, where the strength, density, and sharpness of the haptic feedback are all increased from their respectively small values to their respectively large values. In certain embodiments the modes can be defined based on content that the haptic feedback can complement. For example, an "audio" mode can be defined to include a plurality of haptic parameters and a corresponding plurality of pre-defined values that produce haptic feedback that complements audio. As another example, a "video" mode can be defined to include a plurality of haptic parameters and a corresponding plurality of pre-defined values that produce haptic feedback that complements video.

In the illustrated embodiment, haptic control 320 includes an icon, a title, a slider, a label, an OK button, and a Cancel button. However, the illustrated embodiment is merely an example embodiment, and in alternate embodiment, haptic control 320 can have alternate appearances.

According to an embodiment, the displaying of haptic control 320 by device 310 can be controlled based on a "context" associated with device 310. A "context" is a classification of functionality performed by device 310. As a non-limiting example, device 310 can perform the functionality of outputting communication-based content, such as a voice call or an audio notification. This functionality can be classified as a "communication" context, and it can be determined that haptic feedback is not appropriate for this context. As another non-limiting example, device 310 can perform the functionality of outputting media content, such as outputting an audio song or a video movie. This functionality can be classified as a "media" context, and it can be determined that haptic feedback is appropriate for this context. These are merely non-limiting examples of contexts of device 310, and there can be other types of contexts based on other types of functionality performed by device 310. According to the embodiment, haptic control 320 can only be displayed by device 310 when the context associated with device 310 is a context appropriate for controlling haptic feedback. In the above non-limiting example, device 310 can prevent haptic control 320 from being displayed when device 310 is in a communication context. In contrast, device 310 can cause haptic control to be displayed when device 310 is in a media context. In certain embodiments, device 310 can generate context metadata that identifies the context associated with device 310. Further, in certain embodiments, device 310 can prevent haptic control 320 from being displayed no matter what context is associated with device 310.

As another non-limiting example, device 310 can perform the functionality of outputting media content that includes one or more pre-produced or pre-authored haptic effects. This functionality can be classified as a "haptic media" context, and it can be determined that haptic feedback is not appropriate for this context. For example, if a movie or game includes one or more pre-produced or pre-authored haptic effects that the producer or programmer of that content inserted, it may be desirable not to allow an end user to enable audio-generated haptic effects, as these haptic effects may conflict with the pre-produced or pre-authored haptic effects. In this non-limiting example, for consistency and clarity, a haptic control may still appear when the user interacts with a physical switch of device 310 (or some other input), but the haptic control can be disabled, and thus, not allow the end user to interact with the haptic control.

In one embodiment, device 310 can perform the functionality of automatically converting audio that is output into haptic feedback. In this embodiment, device 310 can use one or more algorithms to automatically convert audio that is to be output into haptic feedback, and output both the audio and the haptic feedback. This functionality can be classified as an "audio-to-haptic" context, and it can be determined that haptic feedback is appropriate for this context. Accordingly, device 310 can cause haptic control 320 to be displayed when device 310 is associated with an audio-to-haptic context, and haptic control 320 can be used to control one or more parameters of the haptic feedback that is generated by automatically converting audio that is also generated by device 310 into the haptic feedback.

According to an embodiment, device 310 can include one or more physical input devices, such as one or more physical buttons or physical switches. Generally, a handheld device includes one or more physical buttons, such as push-buttons, or one or more physical switches, such as rocker switches, toggle switches, in-line switches, or push-button switches. According to the embodiment, by touching a physical button or physical switch of device 310, a user can cause device 310 to display haptic control 320. Further, by touching the physical button or physical switch of device 310, the user can cause device 310 to adjust one or more settings of haptic control 320. For example, by touching the physical button or physical switch of device 310, the user can cause device 310 to adjust one or more haptic parameters of the haptic feedback that can be provided by device 310, where the adjustment of the one or more haptic parameters adjusts the haptic feedback. In certain embodiments, when a user touches a physical button or physical switch of device 310, device 310 only displays haptic control 320 when a context associated with device 310 is a context appropriate for controlling haptic feedback. In certain embodiments, the physical button or physical switch of device 310 is dedicated to displaying haptic control 320 and adjusting one or more settings of haptic control 320, and does not perform any other functionality. In other embodiments, the physical button or physical switch of device 310 also controls other functionality of device 310, such as controlling one or more characteristics of audio that is output by device 310.

In certain embodiments, device 310 displays haptic control 320 when a user touches a plurality of physical buttons or physical switches of device 310. The plurality of touches can be any combination of touches. In other embodiments, device 310 displays haptic control 320 when a user touches a physical button or physical switch of device 310 for a specified period of time. This can be identified as a "long-touch" or "long-press." Thus, haptic control 320 is only displayed within device 310 if the user long-touches or long-presses the physical button or physical switch of 310.

In certain embodiments, device 310 displays haptic control 320 when a user touches a virtual button or switch that can be displayed by device 310. For example, in one embodiment, device 310 displays haptic control 320 when a user accesses a settings application and touches a virtual button or switch of the setting application that can be displayed by device 310. In other embodiments, device 310 displays haptic control 320 when a user gestures within a surface of device 310. In other embodiments, device 310 displays haptic control 320 when a user gestures within a proximate distance of a sensor of device 310.

In certain embodiments, haptic control 320 can include a slider. In these embodiments, a slider of haptic control 320 can be associated with one or more values used to control a haptic feedback parameter. By moving the slider of haptic control 320 to the left or to the right, the user can control the value associated with haptic control 320, and thus, can control the haptic parameter associated with haptic control 320 (i.e., either increasing or decreasing the value associated with the haptic parameter). Thus, by moving the slider of haptic control 320 to the left or to the right, the user can control the haptic feedback that is output by device 310. The slider of haptic control 320 is further described in greater detail in relation to FIG. 4.

In certain embodiments, device 310 simultaneously displays haptic control 320 along with an audio control, where the audio control is configured to control audio that can be provided by device 310. The simultaneous display of haptic control 320 along with the audio control is further described in greater detail in relation to FIGS. 5 and 6.

In certain embodiments, rather than displaying haptic control 320 which is configured to control haptic feedback that can be provided by device 310, device 310 can display a control configured to control other content or feedback that can be provided by device 310, and that can be output to a user. Such feedback or content can include audio or video. In an alternate embodiment, device 310 can display a control configured to control haptic feedback that is not related to media content, such as haptic feedback triggered by one or more keystrokes on a virtual keyboard. Such an embodiment is described below in greater detail in relation to FIG. 8. In another alternate embodiment, device 310 can display a control configured to control haptic feedback where pre-produced or pre-designed haptic effects are present, as previously described. In this alternate embodiment, the control may be present but may be disabled. In another embodiment where pre-produced or pre-designed haptic effects are present, the control can adjust one or more haptic feedback parameters of the pre-produced or pre-designed haptic effects. For example, a producer of a video, or other media content, can design or produce one or more haptic effects that can be output by device 310 when the video is also output by device 310. The user can then control, for example, the strength of these produced or designed haptic effects with the control. Additionally, the one or more haptic feedback parameters that can be adjusted by the control, and the way the one or more haptic feedbacks can be adjusted by the control, can be determined by the producer. For example, the producer can decide that only strength, not density, of the haptic effects can be controlled by the user. Thus, the haptic content that can be embedded in the media content can also include information about which haptic feedback parameters can be controlled by the user. In another alternate embodiment, a user interface event can include an associated control in certain contexts.

For example, if device 310 executes a music application, where audio is not playing, but a user is searching for a song or track to play within a user interface of the music application, then the user could trigger a haptic control for user interface events (for example, to control one or more haptic feedback parameters, such as a strength haptic feedback parameter, a density haptic feedback parameter, or a sharpness haptic feedback parameters) at that time. However, once a song or track is selected and is played by the music application, a context could switch to another context, such as a media context, where the user could no longer trigger the haptic control for user interface events. In yet another alternate embodiment, device 310 can display a control configured to control haptic feedback that is generated by one or more signals received by device 310 from another device (such as a wired or wireless peripheral device). In another embodiment, device 310 can display a control configured to control a brightness of a display of device 310.

Figure 4:
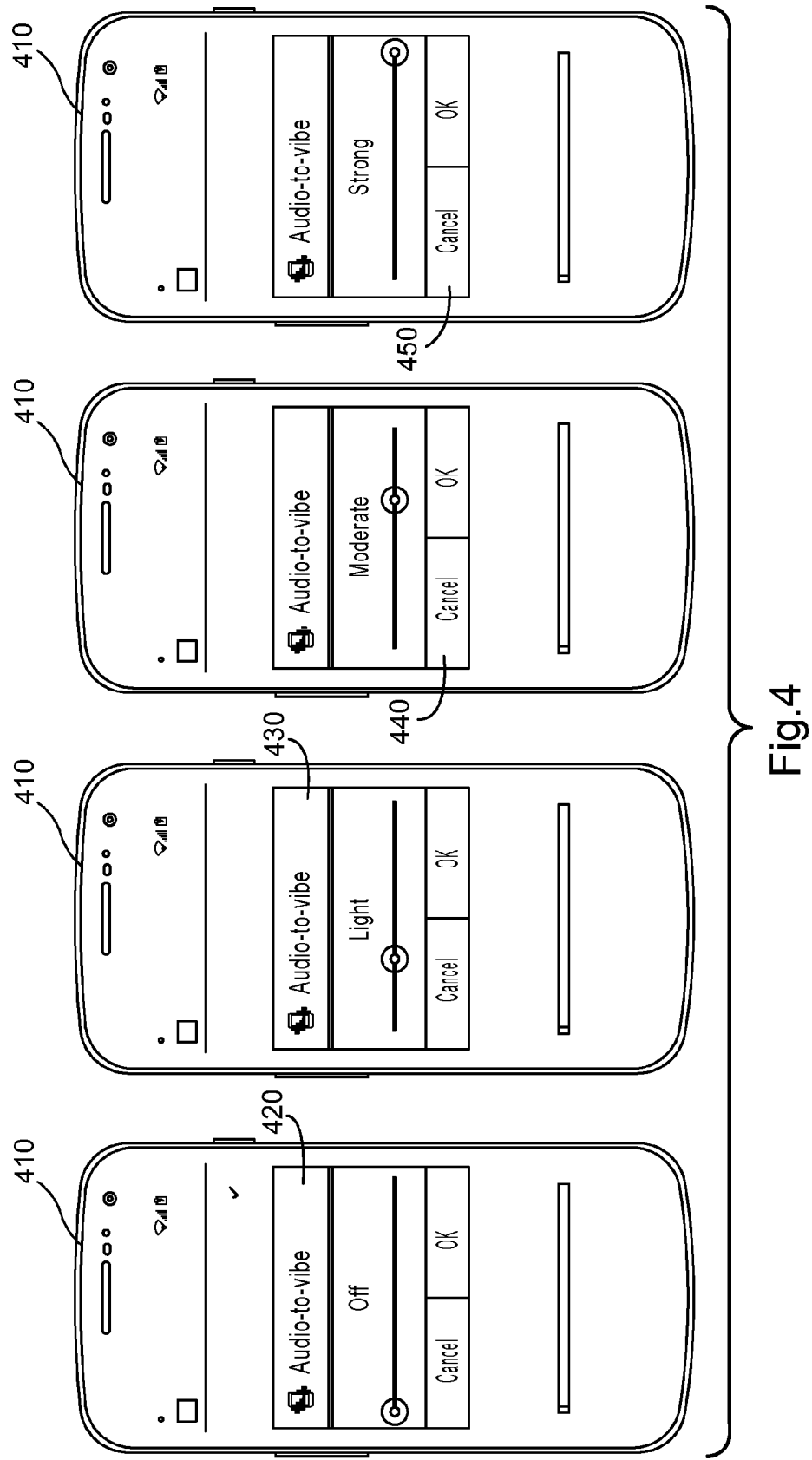
FIG. 4 illustrates example settings of a haptic control displayed within a user interface of a device, according to one embodiment of the invention.

FIG. 4 illustrates example settings of a haptic control (i.e., haptic controls 420, 430, 440, and 450) displayed within a user interface of a device 400, according to one embodiment of the invention. In certain embodiments, as previously described, a haptic control can include a slider, where the slider can be associated with one or more values used to control a haptic feedback parameter. In the illustrated embodiment of FIG. 4, the slider of the haptic control is associated with four positions, where each position corresponds to a value used to control a haptic feedback parameter, where haptic control 420 illustrates a slider associated with a first position, haptic control 430 illustrates a slider associated with a second position, haptic control 440 illustrates a slider associated with a third position, and haptic control 450 illustrates a slider associated with a fourth position. However, the illustrated embodiment of FIG. 4 is merely an example embodiment, and in alternate embodiments, a slider of a haptic control can be associated with any number of positions. Furthermore, in certain embodiments, the slider can be perceived to be associated with an infinite number of positions.

In another embodiment, a haptic control can control one or more dynamic haptic effects that use key frames (i.e., points of interpolation). For example, a slider that includes "FINITE" and "INFINITE" positions can be displayed within a context of dynamic haptic effects, and the key frames can be moved accordingly and adjusted in real time.

As previously described, by moving the slider of a haptic control to the left or to the right, the user can control the value associated with the haptic control, and thus, can control the haptic parameter associated with the haptic control (i.e., either increasing or decreasing the value associated with the haptic parameter). Thus, by moving the slider of the haptic control to the left or to the right, the user can control the haptic feedback that is output by device 410. In the illustrated embodiment of FIG. 4, the slider has a first position (illustrated by haptic control 420), with a first value of a haptic parameter associated with a label of "Off." The slider also has a second position (illustrated by haptic control 430), with a second value of a haptic parameter associated with a label of "Light." The slider also has a third position (illustrated by haptic control 440), with a third value of a haptic parameter associated with a label of "Moderate." The slider also has a fourth position (illustrated by haptic control 450), with a fourth value of a haptic parameter associated with a label of "Strong." According to the illustrated embodiment, when a user makes a gesture within the haptic control of device 410, the slider can move to one of the position illustrated by haptic controls 420, 430, 440, and 450. Furthermore, as illustrated by haptic controls 420, 430, 440, and 450, the label displayed within the haptic control can dynamically change as the slider moves. In an alternate embodiment, rather than making a gesture within the haptic control of device, the user can cause the slider to move by touching a physical button or switch of device 410. In certain embodiments, the haptic control adjusts the haptic parameter once the user moves the slider to a different position, in real-time. In other embodiments, the haptic control waits to adjust the haptic parameter (for example by waiting for the user to make a gesture, such as pressing an OK button, or by waiting for device 410 to cause the haptic control not to be displayed). In certain embodiments, the haptic control adjusts the haptic parameter by interpolating the haptic parameter between the previous value and the new value.

Figure 5:
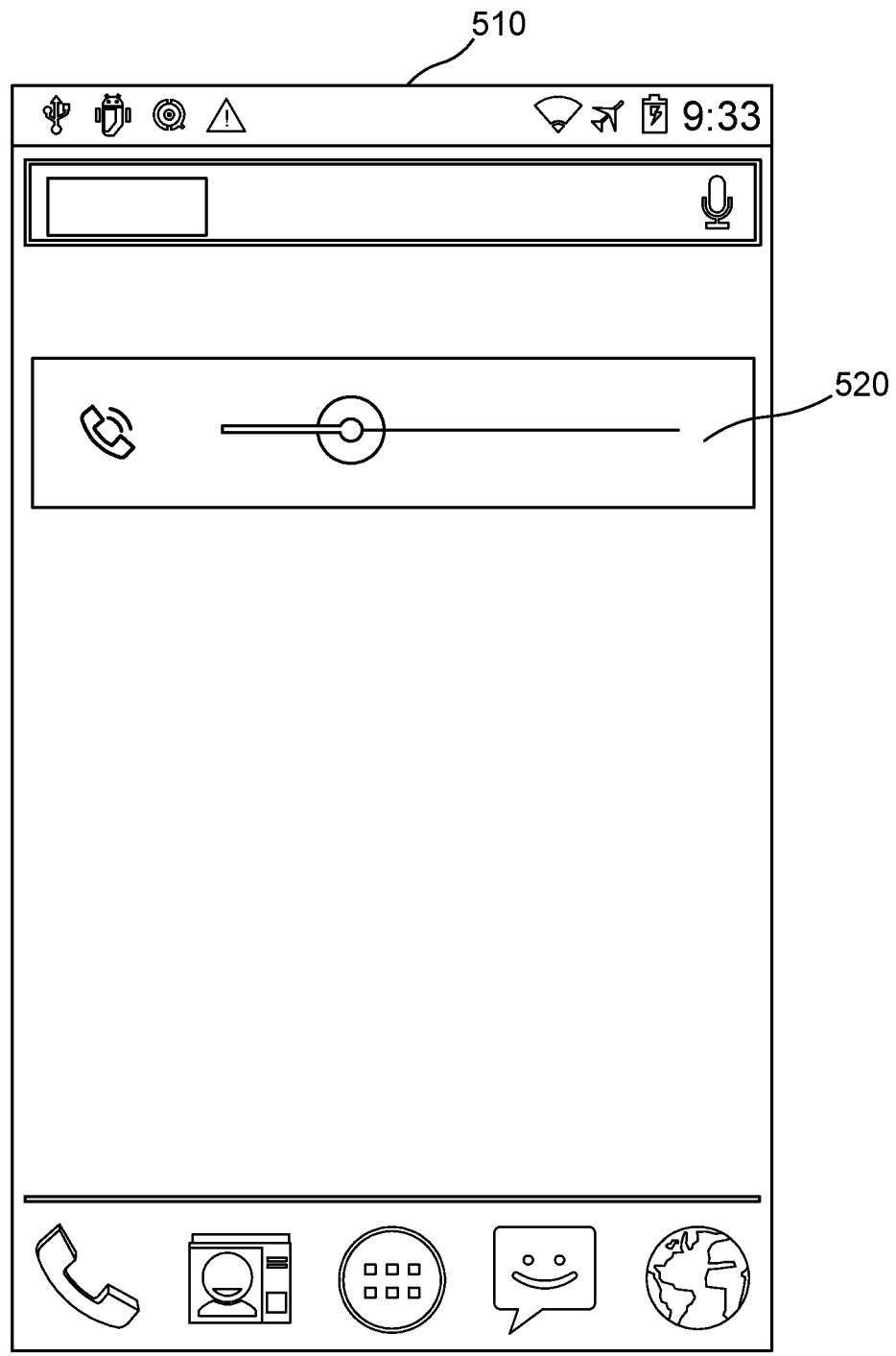
FIG. 5 illustrates an example audio control displayed within a user interface, according to one embodiment of the invention.

FIG. 5 illustrates an example audio control 520 displayed within a user interface 510, according to one embodiment of the invention. In certain embodiments, as previously described, a device simultaneously displays a haptic control along with an audio control, where the audio control is configured to control audio that can be provided by the device. In certain embodiments, the device only simultaneously displays the haptic control along with the audio control, when the context associated with the device is a context appropriate for controlling haptic feedback. Otherwise, the device only displays the audio control and does not display the haptic control. Also, in certain embodiments, the device can either simultaneously display the haptic control and the audio control, or only display the audio control, in response to a user touching a physical button or switch of the device.

According to the illustrated embodiment, audio control 520 is displayed within user interface 510 in response to a user touching a physical button or switch of a device that displays user interface 510. Also according to the embodiment, the device determines that the device has an associated context that is not appropriate for the control of haptic feedback (for example, when the device is outputting audio, such as a "ringtone"). Because the device has an associated context that is not appropriate for the control of haptic feedback, the device displays audio control 520 within user interface 510, and does not display a haptic control within user interface 510.

Figure 6:
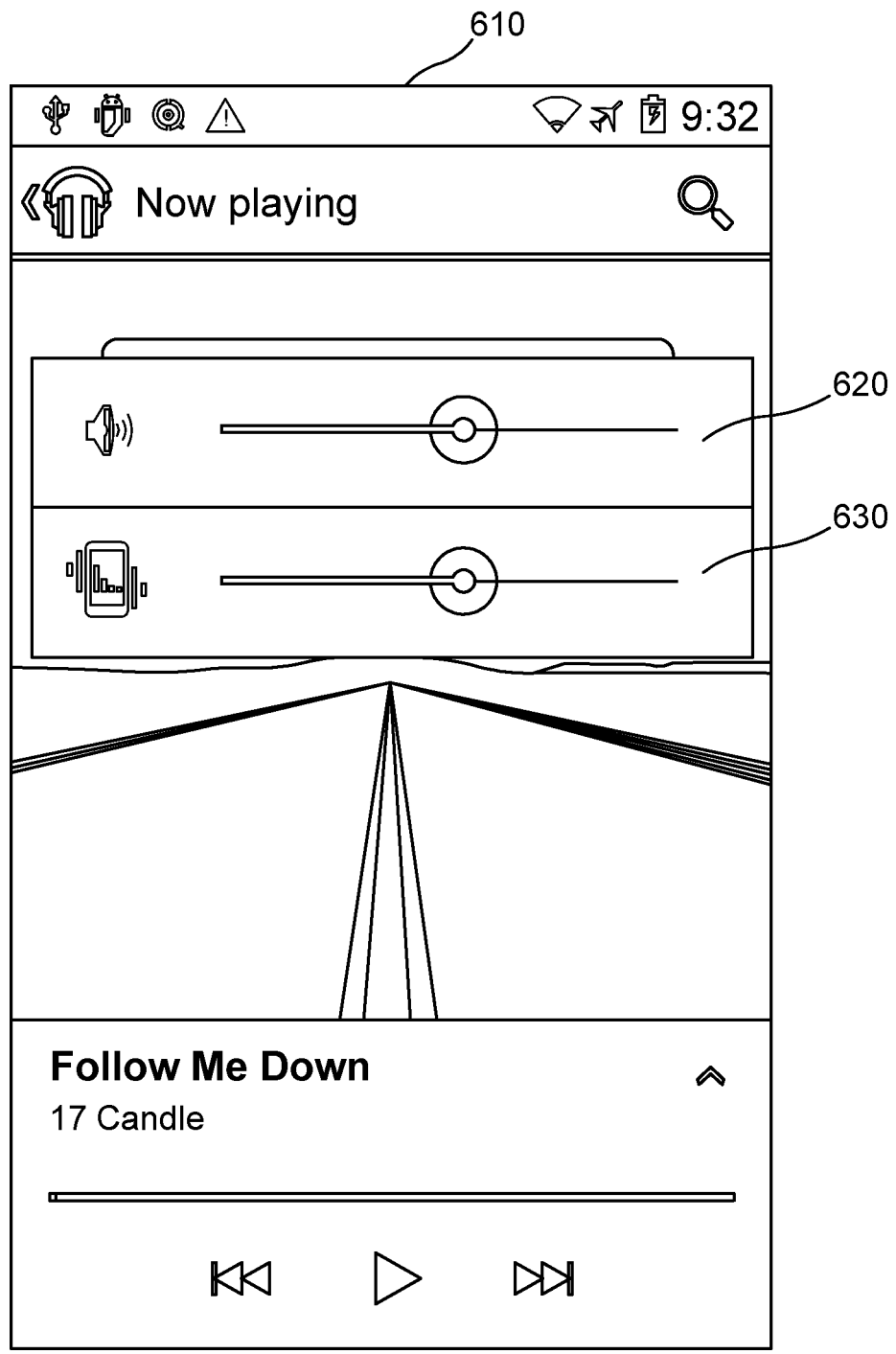
FIG. 6 illustrates an example haptic control displayed simultaneously along with an example audio control within a user interface, according to one embodiment of the invention.

FIG. 6 illustrates an example haptic control 630 displayed simultaneously along with an example audio control 620 within a user interface 610, according to one embodiment of the invention. According to the illustrated embodiment, audio control 620 is displayed within user interface 610 in response to a user touching a physical button or switch of a device that displays user interface 610. Also according to the embodiment, the device determines that the device has an associated context that is appropriate for the control of haptic feedback (for example, when the device is outputting audio, and automatically converting the audio to haptic feedback, which is also output). Because the device has an associated context that is appropriate for the control of haptic feedback, the device simultaneously displays audio control 620 and haptic control 630 within user interface 610. Haptic control 630 can perform functionality similar to haptic control 320 of FIG. 3, and haptic controls 420, 430, 440, and 450 of FIG. 4. In certain embodiments, a user can gesture within either audio control 620 or haptic control 630, and subsequently, when a user touches a physical button or switch of the device that displays user interface 610, the user can control a slider of either audio control 620 or haptic control 630. In alternate embodiments, when a user touches a physical button or switch of the device that displays user interface 610, the user can control a slider of audio control 620, and when a user makes a gesture within haptic control 630, the user can control a slider of haptic control 630. In alternate embodiments, when a user touches a physical button or switch of the device that displays user interface 610, the user first controls audio control 620. When the slider of audio control 620 is at a position that represents a value of "0," a subsequent touch of a physical button or switch of the device that displays user interface 610 controls haptic control 630.

In certain embodiments, rather than display a single audio control (such as audio control 620) within user interface 610, the device can display a plurality of audio controls within user interface 610. In these embodiments, the device can simultaneously display haptic control 630 along with the plurality of audio controls.

Figure 7:
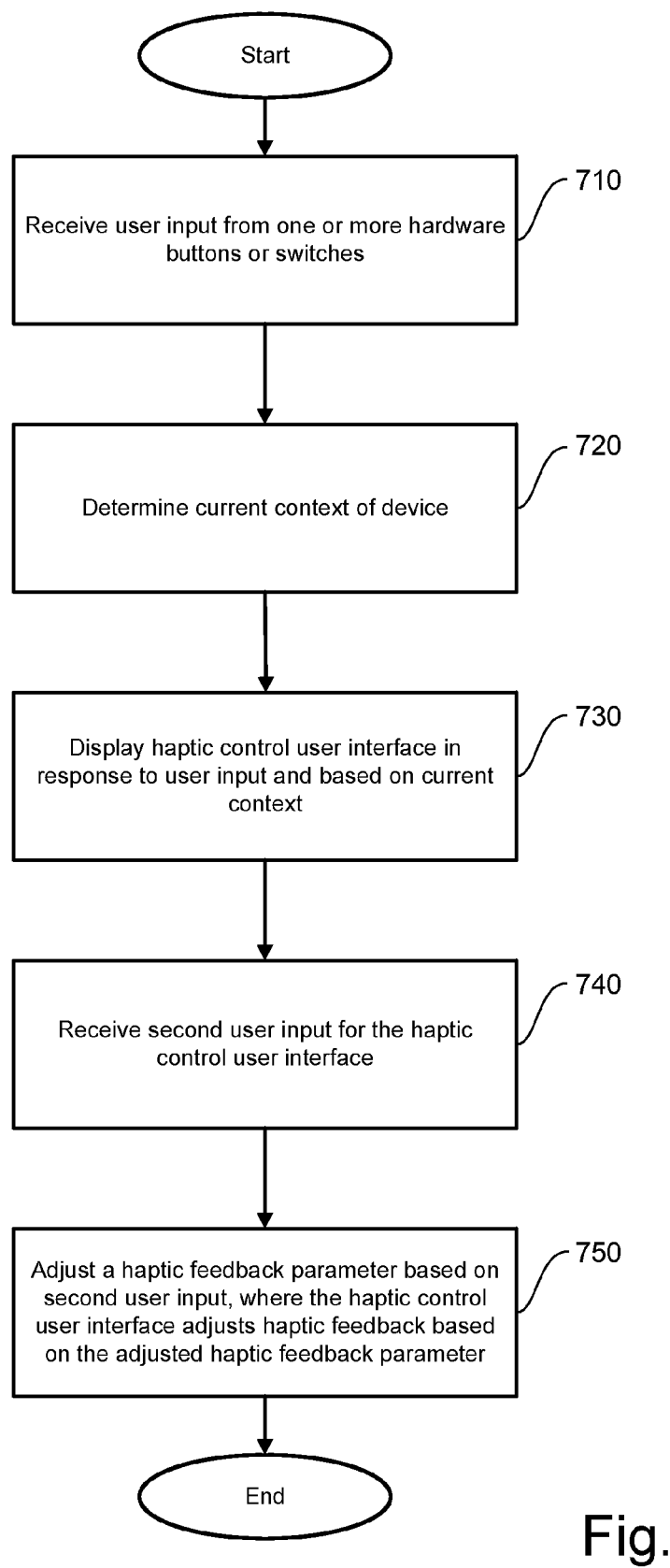
FIG. 7 illustrates a flow diagram of the functionality of a haptic feedback control module, according to one embodiment of the invention.

FIG. 7 illustrates a flow diagram of the functionality of a haptic feedback control module (such as output device drive module 122 of FIG. 1, or haptic feedback control module 216 of FIG. 2), according to one embodiment of the invention. In one embodiment, the functionality of FIG. 7 is implemented by software stored in memory or another computer-readable or tangible medium, and executed by a processor. In other embodiments, the functionality may be performed by hardware (e.g., through the use of an ASIC, a programmable gate array ("PGA"), a field programmable gate array ("FPGA"), etc.), or any combination of hardware and software. Furthermore, in alternate embodiments, the functionality may be performed by hardware using analog components.

The flow begins and proceeds to 710. At 710, a user input is received from one or more hardware buttons or switches of a device. In certain embodiments, the user input can include a signal generated in response to one or more touches of the one or more hardware buttons or switches of the device. In some of these embodiments, the user input can include a signal generated in response to a single touch of a single hardware button or switch of the device. In other of these embodiments, the user input can include one or more signals generated in response to a combination of touches of a plurality of hardware buttons or switches of the device. In other of these embodiments, the user input can include a signal generated in response to a long-touch of a single hardware button or switch of the device. In other embodiments, the user input can be received from one or more virtual buttons or switches of a device, rather than one or more hardware buttons or switches. In other embodiments, the user input can be received from a sensor of a device, rather than one or more hardware button or switches. Further, in other embodiments, the user input can include a signal generated in response to a gesture that a user performs on the device. The flow proceeds to 720.

At 720, a current context of the device is determined. The current context can include a classification of functionality currently performed by the device. The determination of the current context can include determining whether the current context is appropriate for controlling haptic feedback. The flow proceeds to 730.

At 730, a haptic control user interface (or "haptic control") is displayed in response to the user input and based on the current context. In certain embodiments, the haptic control can be displayed along with an audio control user interface (or "audio control") in response to the user input, where the audio control is configured to adjust audio. In some of these embodiments, the haptic control and the audio control can be displayed simultaneously within a user interface of the device. In certain embodiments, the haptic control can include a slider. In other embodiments, rather than a haptic control, another type of control can be displayed in response to the user input and based on the current context. In certain embodiments, the control can be a virtual keyboard haptic control configured to adjust haptic feedback that is generated by a virtual keyboard. In other embodiments, the control can be a haptic control configured to adjust haptic feedback that is generated by one or more pre-designed haptic effects. In other alternate embodiments, the control can be a haptic control configured to adjust haptic feedback that is generated by a user interface element. In yet other embodiments, the control can be a haptic control configured to adjust haptic feedback that is generated by one or more dynamic haptic effects that use one or more key frames. In yet other alternate embodiments, the control can be a haptic control configured to adjust haptic feedback that is generated by one or more signals that are received. In yet other embodiments, the control can be a control configured to adjust a brightness of a display. The flow proceeds to 740.

At 740, a second user input is received for the haptic control. In certain embodiments, the second user input can include a signal generated in response to one or more touches of the one or more hardware buttons or switches of the device. In some of these embodiments, the second user input can include a signal generated in response to a single touch of a single hardware button or switch of the device. In other of these embodiments, the second user input can include one or more signals generated in response to a combination of touches of a plurality of hardware buttons or switches of the device. In other of these embodiments, the second user input can include a signal generated in response to a long-touch of a single hardware button or switch of the device. In other embodiments, the second user input can be received from one or more virtual buttons or switches of a device, rather than one or more hardware buttons or switches. In other embodiments, the second user input can be received from a sensor of a device, rather than one or more hardware button or switches. In certain embodiments, the second user input can include a signal generated in response to a gesture within the haptic control. The flow proceeds to 750.

At 750, a haptic feedback parameter is adjusted based on the second user input. The haptic control can adjust haptic feedback based on the adjusted haptic feedback parameter. In certain embodiments, the haptic feedback parameter is a strength parameter, a density parameter, a sharpness parameter, or a mode parameter. Also, in certain embodiments, the haptic feedback is generated based on the audio. In embodiments where another type of control is displayed rather than a haptic control, the control can adjust a feedback parameter of another type, where the control can adjust feedback of another type based on the adjusted feedback parameter. Such examples of feedback can include haptic feedback that is generated by a virtual keyboard, haptic feedback that is generated by one or more pre-designed haptic effects, haptic feedback that is generated by a user interface element, haptic feedback that is generated by one or more dynamic haptic effects that use one or more key frames, or haptic feedback that is generated by one or more signals that are received. In embodiments where another type of control is displayed rather than a haptic control, the control can adjust other content, such as a brightness of a display. The flow then ends.

Figure 8:
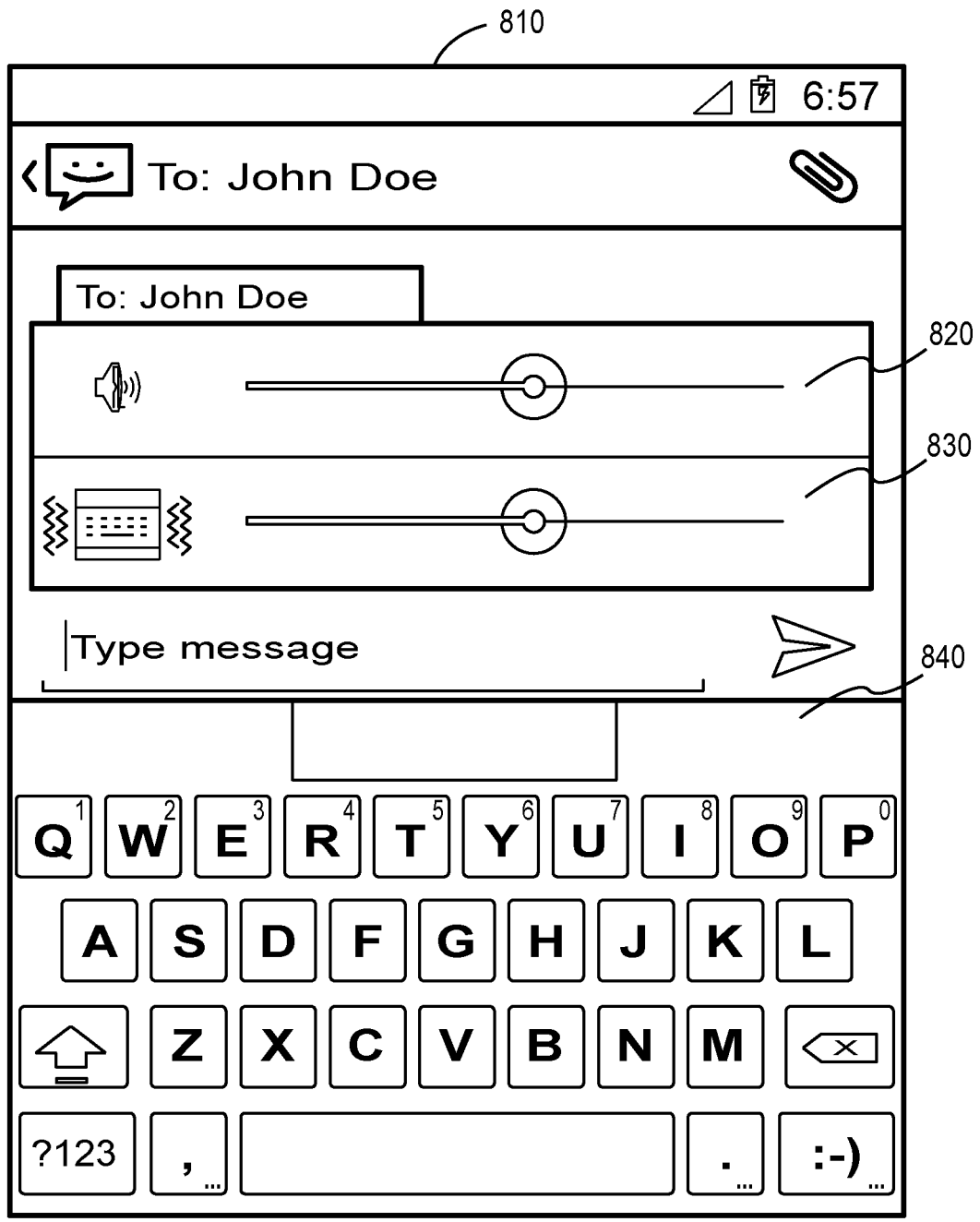
FIG. 8 illustrates an example virtual keyboard haptic control displayed simultaneously along with an example audio control within a user interface, according to one embodiment of the invention.

FIG. 8 illustrates an example virtual keyboard haptic control 830 displayed simultaneously along with an example audio control 820 within a user interface 810, according to one embodiment of the invention. According to the illustrated embodiment, audio control 820 is displayed within user interface 810 in response to a user touching a physical button or switch of a device that displays user interface 810. Also, according to the embodiment, the device determines that the device has an associated context that is appropriate for the control of haptic feedback that is generated by virtual keyboard 840. Because the device has an associated context that is appropriate for the control of haptic feedback generated by virtual keyboard 840, the device simultaneously displays audio control 820 and virtual keyboard haptic control 830 within user interface 810. Virtual keyboard haptic control 830 is configured to control haptic feedback that can be provided by virtual keyboard 840. More specifically, virtual keyboard haptic control 830 can be configured to adjust one or more haptic parameters of the haptic feedback that can be provided by virtual keyboard 840, where the adjustment of the one or more haptic parameters adjusts the haptic feedback. An example haptic feedback parameter is a strength parameter that controls a strength of the haptic feedback. Another example haptic feedback parameter is a density parameter that controls a density of the haptic feedback. Yet another example haptic feedback parameter is a sharpness parameter that controls a sharpness of the haptic feedback.

Thus, according to an embodiment, a haptic feedback control system that controls haptic feedback based on a user input and a context of a device can be provided. The haptic feedback control system can greatly simplify haptic feedback control from a device user's perspective.

The features, structures, or characteristics of the invention described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present invention. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the invention as discussed above may be practiced with steps in a different order, and/or with elements in configurations which are different from those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A non-transitory computer-readable medium having instructions stored thereon that, when executed by a processor, cause the processor to control feedback output to a user, the controlling comprising:
   receiving a user input;
   determining a current context comprising a classification of functionality performed by a device;
   displaying a haptic control in response to the user input when the current context is a context that allows control of haptic feedback; and
   adjusting a haptic feedback parameter according to the haptic control, wherein the haptic control is configured to adjust the haptic feedback output to the user based on the adjusted haptic feedback parameter.

2. The non-transitory computer-readable medium of claim 1, wherein the receiving the user input comprises receiving a signal from a physical button or switch.

3. The non-transitory computer-readable medium of claim 1, wherein the receiving the user input comprises receiving a signal from a virtual button or switch.

4. The non-transitory computer-readable medium of claim 1, wherein the receiving the user input comprises receiving a gesture.

5. The non-transitory computer-readable medium of claim 1, wherein the receiving the user input comprises receiving one or more signals from a plurality of physical buttons or switches.

6. The non-transitory computer-readable medium of claim 1, wherein the receiving the user input comprises receiving one or more signals from a plurality of virtual buttons or switches.

7. The non-transitory computer-readable medium of claim 1, wherein the receiving the input comprises receiving a signal from a sensor.

8. The non-transitory computer-readable medium of claim 1, wherein the haptic feedback parameter comprises one of a strength parameter, a density parameter, a sharpness parameter, or a mode parameter.

9. The non-transitory computer-readable medium of claim 1, the controlling further comprising:
   displaying an audio control in response to the user input, wherein the audio control is configured to adjust audio.

10. The non-transitory computer-readable medium of claim 9, wherein the haptic control and the audio control are displayed simultaneously within a user interface.

11. The non-transitory computer-readable medium of claim 10, wherein the haptic feedback is generated based on the audio.

12. The non-transitory computer-readable medium of claim 1, wherein the adjusting the haptic feedback parameter further comprises:
   receiving a second user input for the haptic control; and
   adjusting the haptic feedback parameter based on the second user input.

13. The non-transitory computer-readable medium of claim 1, wherein the haptic control comprises a slider.

14. The non-transitory computer-readable medium of claim 1, wherein the haptic control comprises a virtual keyboard haptic control configured to adjust haptic feedback output to the user that is generated by a virtual keyboard.

15. The non-transitory computer-readable medium of claim 1, wherein the haptic control is further configured to adjust haptic feedback output to the user that is generated by one or more pre-designed haptic effects.

16. The non-transitory computer-readable medium of claim 1, wherein the haptic control is further configured to adjust haptic feedback output to the user that is generated by a user interface element.

17. The non-transitory computer-readable medium of claim 1, wherein the haptic control is further configured to adjust haptic feedback output to the user that is generated by one or more dynamic haptic effects that use one or more key frames.

18. The non-transitory computer-readable medium of claim 1, wherein the haptic control is further configured to adjust haptic feedback output to the user that is generated by one or more signals that are received.

19. The non-transitory computer-readable medium of claim 1, wherein the haptic control is further configured to adjust a brightness of a display.

20. The non-transitory computer-readable medium of claim 1, the controlling further comprising preventing the haptic control from being displayed in response to the user input when the current context is a context that does not allow control of haptic feedback.

21. A computer-implemented method for controlling feedback output to a user, the computer-implemented method comprising:
  receiving a user input;
  determining a current context comprising a classification of functionality performed by a device;
  displaying a haptic control in response to the user input when the current context is a context that allows control of haptic feedback; and
  adjusting a haptic feedback parameter according to the haptic control, wherein the haptic control is configured to adjust the haptic feedback output to the user based on the adjusted haptic feedback parameter.

22. The computer-implemented method of claim 21, wherein the receiving the user input comprises receiving a signal from a physical button or switch.

23. The computer-implemented method of claim 21, further comprising:
  displaying an audio control in response to the user input, wherein the audio control is configured to adjust audio.

24. The computer-implemented method of claim 23, wherein the haptic control and the audio control are displayed simultaneously within a user interface.

25. A feedback control system comprising:
  a memory configured to store a feedback control module; and
  a processor configured to execute the feedback control module stored on the memory;
  wherein the feedback control module is further configured to receive a user input;
  wherein the feedback control module is further configured to determine a current context comprising a classification of functionality performed by a device;
  wherein the feedback control module is further configured to display a haptic control in response to the user input when the current context is a context that allows control of haptic feedback; and
  wherein the feedback control module is further configured to adjust a haptic feedback parameter according to the haptic control, wherein the haptic control is configured to adjust haptic feedback output to a user based on the adjusted haptic feedback parameter.

26. The feedback control system of claim 25, wherein the feedback control module is further configured to receive a signal from a physical button or switch.

27. The feedback control system of claim 25,
  wherein the feedback control module is further configured to display an audio control in response to the user input, wherein the audio control is configured to adjust audio.

28. The feedback control system of claim 27, wherein the feedback control module is further configured to display the haptic control and the audio control simultaneously within a user interface.

* * * * *